United States Patent
Weber et al.

(10) Patent No.: US 8,732,201 B2
(45) Date of Patent: May 20, 2014

(54) SYSTEMS AND/OR METHODS FOR AUTOMATICALLY DERIVING WEB SERVICE PERMISSIONS BASED ON XML STRUCTURE PERMISSIONS

(75) Inventors: Heiko Weber, Pfungstadt (DE); Juliane Harbarth, Griesheim (DE)

(73) Assignee: Software AG, Darmstadt (DE)

( * ) Notice: Subject to any disclaimer, the term of this patent is extended or adjusted under 35 U.S.C. 154(b) by 71 days.

(21) Appl. No.: 13/406,981

(22) Filed: Feb. 28, 2012

(65) Prior Publication Data

US 2013/0226970 A1   Aug. 29, 2013

(51) Int. Cl.
*G06F 17/30*   (2006.01)

(52) U.S. Cl.
USPC .......................................... 707/781

(58) Field of Classification Search
CPC ................. G06F 2221/2141; G06F 21/604
USPC .......................... 707/781, 783, 785
See application file for complete search history.

(56) References Cited

U.S. PATENT DOCUMENTS

| | | | |
|---|---|---|---|
| 7,908,286 B2 | 3/2011 | Krishnaprasad et al. | |
| 2004/0143649 A1 | 7/2004 | Feng et al. | |
| 2004/0199636 A1 | 10/2004 | Brown et al. | |
| 2005/0086197 A1 | 4/2005 | Boubez et al. | |
| 2006/0031228 A1* | 2/2006 | Bosworth et al. | 707/10 |
| 2006/0129605 A1 | 6/2006 | Doshi | |
| 2006/0253420 A1 | 11/2006 | Hinton et al. | |
| 2007/0028221 A1* | 2/2007 | Ukelson et al. | 717/136 |
| 2007/0050394 A1* | 3/2007 | Sterling et al. | 707/102 |
| 2008/0208806 A1* | 8/2008 | Dalfo et al. | 707/3 |
| 2009/0024939 A1* | 1/2009 | Cudich et al. | 715/762 |
| 2009/0320093 A1* | 12/2009 | Glazier et al. | 726/1 |
| 2010/0146035 A1 | 6/2010 | Matsa et al. | |
| 2010/0250519 A1* | 9/2010 | Fiebig et al. | 707/718 |
| 2011/0213840 A1* | 9/2011 | Boyer et al. | 709/205 |
| 2013/0086184 A1* | 4/2013 | Kavantzas et al. | 709/206 |

OTHER PUBLICATIONS

Salesforce.com, "Quick Start", Feb. 2010, pp. 1-9.*
Kavantzas et al., "Conditional Attachment Model for Web Service Policies" (provisional of 2013/0086184), Sep. 30, 2011, pp. 1-59.*
XML Firewall by Vordel. [Retrieved Feb. 28, 2012]. http://www.vordel.com/solutions/xml_firewall2.html.

(Continued)

*Primary Examiner* — Jorge A Casanova
(74) *Attorney, Agent, or Firm* — Nixon & Vanderhye PC

(57) ABSTRACT

Certain example embodiments relate to techniques for automatically deriving web service permissions based on XML structure permissions. A call for a web service operation is received from a client at a web service runtime engine. XML data objects from a database of XML data objects located on an XML server implicated by the called web service operation are identified. The XML data objects have corresponding XML data structures. Access permissions for the user for the identified XML data objects are retrieved from the XML server, the access permissions for the web service having been generated automatically from access permissions based on the XML data structures for corresponding XML data objects. The called web service operation is either permitted or prohibited based on a determination, at the web service runtime engine and based on the retrieved access permissions. Thus, data access requests are handled in the "higher" web service layer.

20 Claims, 8 Drawing Sheets

(56) References Cited

OTHER PUBLICATIONS

XML Firewall by Layer 7—Overview. [Retrieved Feb. 28, 2012]. http://www.layer7tech.com/products/xml-firewall.

XML Firewall by Layer 7—Features/Functionality. [Retrieved Feb. 28, 2012]. http://www.layer7tech.com/products/xml-firewall.

XML SOA Gateway by Layer 7—Overview. [Retrieved Feb. 28, 2012]. http://www.layer7tech.com/products/soa-gateway.

XML SOA Gateway by Layer 7—Features/Functionality. [Retrieved Feb. 28, 2012]. http://www.layer7tech.com/products/soa-gateway.

Software AG—WebMethods Tamino XML Server. [Retrieved Feb. 28, 2012]. http://www.softwareag.com/corporate/images/SAG_TaminoXML_FS_Jul09-web_tcm16-5580.pdf.

Software AG: "Tamino WebDAV Server," Internet Citation, May 2001, XP002446634 (14 pages).

Damiani, E., et al., "A Fine-Grained Access Control System for XML Documents," ACM Transactions on Information and System Security, vol. 5, No. 2, May 1, 2002 (34 pages).

European Search Report issued in European Application No. 12 15 7444 dated Jun. 7, 2013 (4 pages).

* cited by examiner

FIG. 9

SYSTEMS AND/OR METHODS FOR AUTOMATICALLY DERIVING WEB SERVICE PERMISSIONS BASED ON XML STRUCTURE PERMISSIONS

FIELD OF THE INVENTION

Certain example embodiments described herein relate to computer database security mechanisms. More particularly, certain example embodiments described herein relate to techniques for automatically deriving web service permissions based on XML structure permissions.

BACKGROUND AND SUMMARY OF EXAMPLE EMBODIMENTS OF THE INVENTION

A means of XML data storage, e.g. an XML database, usually offers some security mechanisms to define and enforce access to its data which is based on the XML data structure. The assignee of the instant invention, for example, uses XPath expressions to define access permissions based on the XML structure of the data stored in its webMethods Tamino XML Server product. In this regard, security may be defined via configurations including sets of users/groups and access rules to the XML structure via XPath expressions.

When allowing access to the XML data via web services, basic means of access can be created automatically from the XML schema definitions. Tamino does so by offering CRUD service generation, where CRUD is an acronym for Create, Read, Update, and Delete. Services created therewith allow the respective operations upon the XML data corresponding to the schema. More particularly, the Tamino XML Server provides an XML database and a mechanism to create CRUD web services based on XML Schema definitions, while the assignee's Web Service Stack provides a web service runtime environment for deploying the created CRUD web service. The structure-based access control to the data is available in Tamino, and WSDL files are automatically generated by Tamino and deployed into the web service runtime environment.

In the realm of web services, many technologies are available to restrict access to services and operations defined therein to certain users. For instance, web service runtime environments typically provide means to enforce access restrictions to the web services deployed on them, oftentimes using standardized mechanisms such as XACML or WS-Policy, Unfortunately, however, restrictions defined at the data level are believed to apply only at the time when the data is actually accessed. That is, if a user employs an operation in a web service that tries to do something with the data for which the user has no permission, the service layer has no knowledge of the attempted operation, unless it has been told about it by other means. Only at the moment that data access is actually attempted will an error be generated, and only then will the service be obliged to handle the error in some way and inform the user or caller, accordingly.

Moreover, security policies implemented using standardized mechanisms like XACML or WS-Policy typically have to be configured in the web service runtime environment and are not dynamically generated based on existing security definitions on the accessed data structures. And while there are some available solutions that involve automatic generation of web services based on data structure definitions, no existing solution is believed to focus on deriving runtime security definitions based in data structure security definitions and no existing solution is believed to focus on dynamic WSDL generation based on the security definitions of the data structure. For instance, currently available ideas and concepts that dynamically add security considerations to WSDL files do that in respect to general security aspects and do not generate WSDL files that contain security information specific to a certain caller based on access permissions in the underlying backend system as described below in connection with certain example embodiments.

Thus, it will be appreciated that there is a need in the art for techniques that allow data access requests to be handled, for security purposes, in the "higher" web service layer.

One aspect of certain example embodiments relates to a unique approach to deriving permissions to access web services depending on the permissions for access granted at the database, rather than relying only on the access control done at the web service layer.

Another aspect of certain example embodiments relates to a two-level security system, where the higher level security features are automatically derived from the underlying database. This may, in certain example instances, advantageously result in easier setup, e.g., if proper access rights are set within the database.

Another aspect of certain example embodiments relates to techniques for deriving security settings that are defined on an XML data structure level for possible handling at the web service layer. In certain example embodiments where data access requests that are forbidden according to the data layer can be dealt with accordingly in the "higher" web service layer, the overall system advantageously may become more robust, e.g., in the sense that these accesses can be refused earlier and more cleanly (e.g., without having to process the request at the higher layer(s) and subsequently pass it to the lower layer(s) where it will be prohibited). Another advantage relates to enhanced usability, as the system's web service interface becomes clearer and more efficient when only the access means that are permitted for a certain caller are presented.

In certain example embodiments, a computer system is provided. A web service runtime engine thereof includes a plurality of web services configured to perform operations in connection with XML data, and a web service runtime access enforcement module. An XML server thereof includes a non-transitory XML data storage area tangibly storing the XML data; a non-transitory XML schema storage area tangibly storing a plurality of XML schemas that describe the XML data; and a non-transitory access control list (ACL) storage area tangibly storing XML structure-based ACLs, defining whether and (if possible) how clients and/or web services can access the XML data. The web service runtime access enforcement module is configured to determine, at the web service runtime engine, whether a given web service initiated by or on behalf of a user using a client computer can perform one or more requested operations on the XML data, based on a corresponding XML structure-based ACL stored in the non-transitory ACL storage area.

For instance, according to certain example embodiments, the web service runtime access enforcement module may be configured to selectively either (a) prevent the one or more requested operations of the given web service and cause an error to be returned to the client, or (b) allow the one or more requested operations of the given web service and cause their results, if any, to be returned to the client, in dependence on the determination.

According to certain example embodiments, the system may further include an XACML enforcement component and an XACML generator, located within the web service runtime access enforcement component of the web service runtime engine, that are configured to cooperate with one another to enable access control policies to be set using action, target, and subject attributes.

In certain example embodiments, there is provided an access control method for use in a computer system including a plurality of client computers operated by respective users, an XML server, and a web service runtime engine interposed between the client computers and the XML server. A call for a web service operation is received, from a client computer and at the web service runtime engine. XML data objects from a database of XML data objects located on the XML server implicated by the web service operation that has been called are identified, with the XML data objects having corresponding XML data structures. Access permissions for the user for the identified XML data objects are retrieved from an access permission store on the XML server, with the access permissions in the access permission store being generated automatically from XML data structures for corresponding XML data objects. It is determined, at the web service runtime engine and based on the retrieved access permissions, whether the called web service operation can be performed on behalf of the user. Based on the determination, the called web service operation is either permitted or prohibited.

According to certain example embodiments, a web service response may be returned to the client following the permitting or prohibiting.

In certain example embodiments, there is provided a web service access control method for use in a computer system including a plurality of client computers operated by respective users, an XML server storing XML documents in a storage location thereon, and a web service runtime engine interposed between the client computers and the XML server. A request for a user-specific WSDL from a given client computer is received at the web service runtime engine. A listing of all web service calls possible for the given client computer is retrieved from a store of generic WSDL files storing all possible web service calls for all client computers and all users. The store of generic WSDL files is located on the XML server. A root element of the affected XML documents is identified for each web service call possible for the given client computer. XML schemas associated with the identified root element(s) are obtained from the XML server. XML documents associated with the obtained XML schemas are determined. Access permissions for the user for the identified XML documents are derived from an access permission store on the XML server, with the access permissions in the access permission store being generated in dependence on structures associated with the XML documents. The user-specific WSDL is generated from the derived access permissions such that the user-specific WSDL includes operations where the required access to the XML documents is granted for the respective user. The user-specific WSDL is returned to the client.

According to certain example embodiments, each said client may be configured to control access to web services in dependence on a user-specific WSDL with its respective user.

According to certain example embodiments, the generic WSDL files may include extensions added by a web service generator during web service creation, the extensions potentially being indicative of which XML data can be accessed in which manner by an associated web service call. For instance, the extensions may be CRUD-type extensions.

In certain example embodiments, non-transitory computer readable storage media tangibly storing instructions that, when executed by at least one processor of a computer, may perform one of these and/or other methods.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIGS. 8-9 are example screenshots showing how a wizard can be used to generate a CRUD web service, in accordance with certain example embodiments.

DETAILED DESCRIPTION OF EXAMPLE EMBODIMENTS OF THE INVENTION

Certain example embodiments relate to an approach to deriving permissions related to web services depending on the permissions granted at the XML database, rather than relying only on the access control at the web service layer. For instance, certain example embodiments may provide another instance to check whether the client requesting a web service is allowed to access data inside an XML database, e.g., rather than granting or blocking access to the database once the permissions established inside the database itself are validated. Certain example embodiments allow the web services runtime to create its own WSDL security files based on the access structures of the database, thereby enabling the web services runtime to also enforce access security. This example approach helps shift access control enforcement to the web services runtime, while keeping the validation on the XML server active for improved security. By adding a WSDL engine and a web service runtime access enforcement module to the web service runtime engine, while also modifying the way current web services operate, the web service may already know which data sets it is allowed to access, thereby reducing the authentication load on the XML database for all blocked operations.

Figure 1:
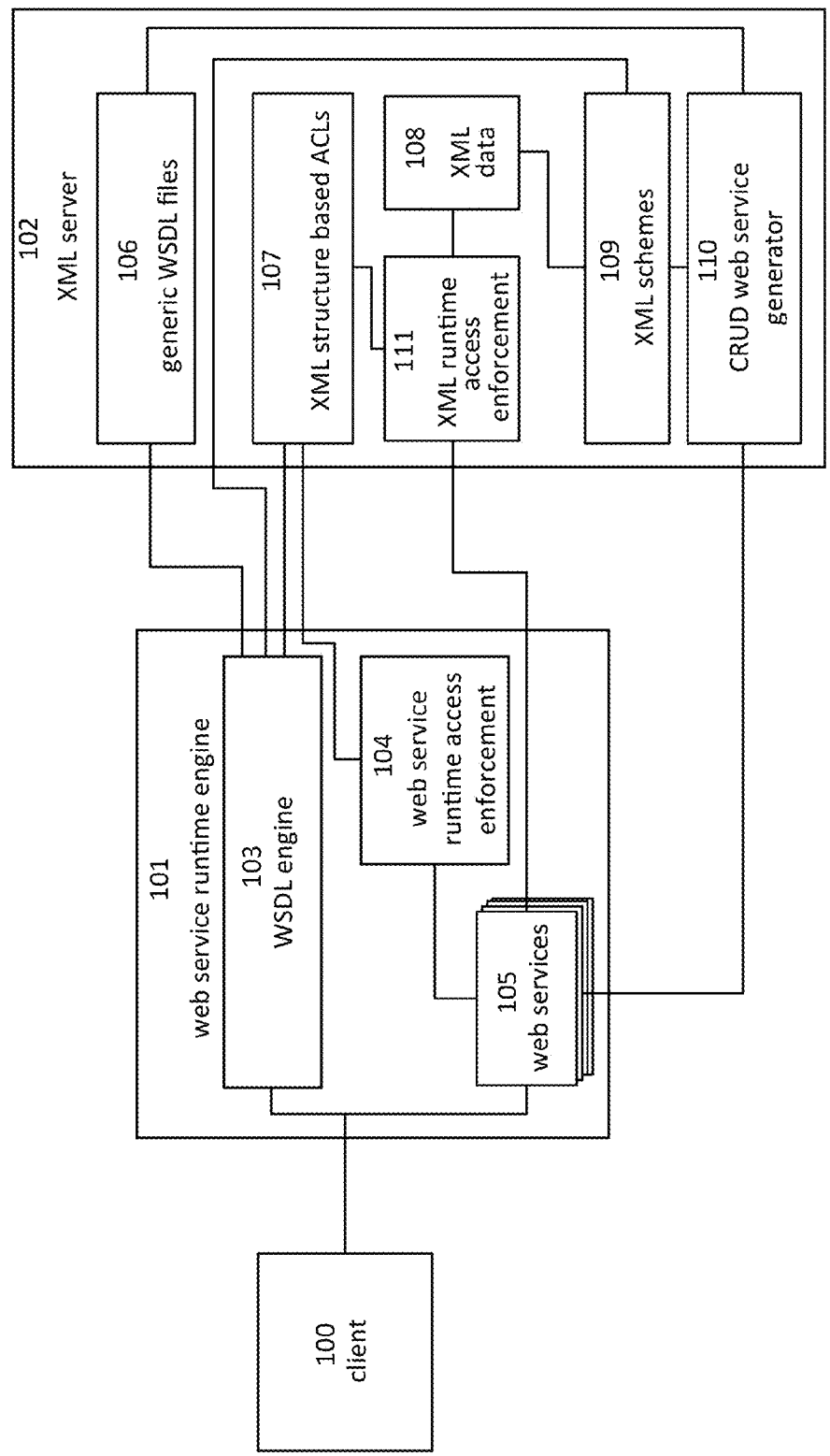
FIG. 1 is a block diagram of a system that may be used to leverage techniques for automatically deriving web service permissions based on XML structure permissions, and to enable access data access requests to be handled, for security purposes, in the "higher" web service layer, in accordance with certain example embodiments.

Referring now more particularly to the drawings in which like reference numerals indicate like components throughout the several views, FIG. 1 is a block diagram of a system that may be used to leverage techniques for automatically deriving web service permissions based on XML structure permissions, and to enable access data access requests to be handled, for security purposes, in the "higher" web service layer, in accordance with certain example embodiments. As shown in FIG. 1, an XML server 102 may access XML data 108 in a suitable storage location or repository. Access to this data is restricted via structure-based access control lists (ACLs) 107, and there may be a runtime component 111 that helps enforce these access restrictions.

XML schemas 109, which also may be stored in a suitable storage location or repository, help define the structure of the XML data 108. Based on these XML schemas 109, a CRUD web service generator 110 may generate simple web services 105 and WSDL files 106 describing these web services. The web services can be deployed to a web service runtime engine 101 to be accessed via a client 100, via any suitable request type (e.g., via SOAP requests). It is noted that the web service runtime engine 101 and the XML server 102 may be resident on the same computer or computer system and thus may share the same processing resources (e.g., processor(s), memory, and/or physical storage media) in certain example implementations. In other example implementations, these components may be located remote from one another and may be provided on distinct computer systems and thus may have access to different respective processing resources.

The web service runtime engine 101 includes a web service runtime access enforcement module 104, which is a runtime module that is configured to access the XML structure-based ACLs 107, potentially during the execution of web services 105, e.g., to retrieve the current access permissions to the XML data 108 and thereby decide whether a given caller is permitted to execute the web service(s) in question. If the required access level (e.g., an update of certain XML elements or attributes) is not permitted based on the XML structure-based ACLs 107, the web service runtime access enforcement module 104 is configured to reject the execution of the respective web service call and return an access violation to the client 100, from which the now-disallowed call was sent. On the other hand, if the required operation on the XML data 108 is granted based on the XML structure-based ACLs 107, then the web services 105 will execute the operation.

This example approach allows for at least some of the access enforcement to be moved to a level outside of the XML server 102 which, in turn, advantageously reduces the load on the XML server 102 while also allowing a distribution across many instances of the web service runtime engine 101 to provide a scalable architecture. In certain example embodiments, this approach may be used to help ensure that only trusted web services runtime engines 101 (or instances thereof) that are controlled by a web service runtime access enforcement module 104 may gain access to the XML server 102. In such example embodiments, it becomes possible to decrease the importance of, and sometimes even potentially render obsolete, the XML runtime access enforcement module 111 in the XML server 102. In so doing, it advantageously may be possible to yet further reduce the load on the XML server 102.

Figure 2:
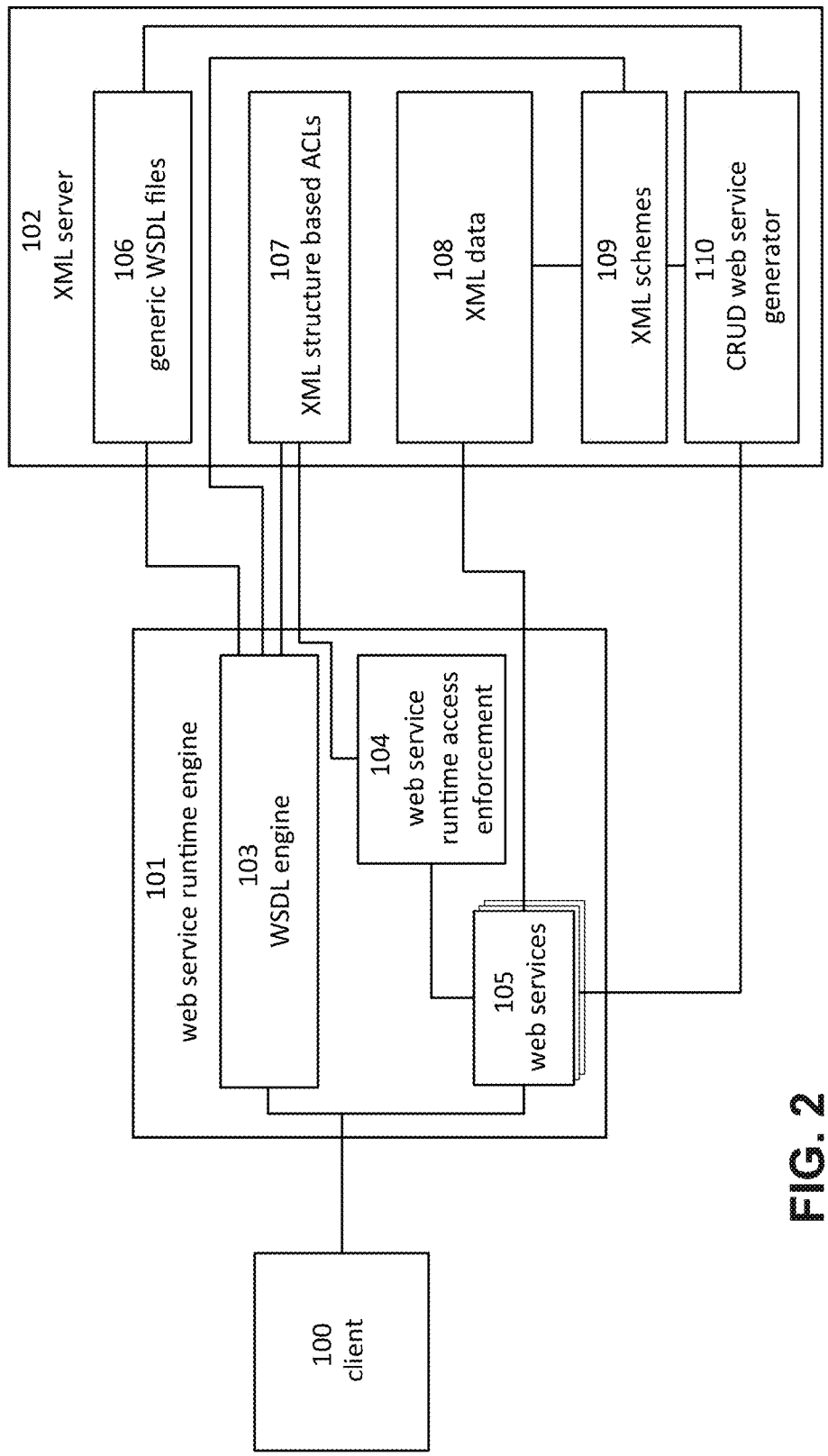
FIG. 2 shows the components of the FIG. 1 example system, where a trust relationship exists between the web service runtime engine and the XML server, in accordance with certain example embodiments.

FIG. 2 shows the components of the FIG. 1 example system, where a trust relationship exists between the web service runtime engine 101 and the XML server 102, and only trusted clients are allowed access to the XML server 101, thereby rendering obsolete the XML runtime access enforcement 111, in accordance with certain example embodiments. Thus, in FIG. 2, unlike in FIG. 1, there is no XML runtime access enforcement module 111 interposed between the XML data 108 and the web services 105. The same or similar security mechanisms instead are moved to the higher level of the web service runtime engine 101, wherein the web service runtime access enforcement module 104 is located, e.g., as the web service runtime access enforcement module 104 takes the place of the XML runtime access enforcement module 111.

Figure 3:
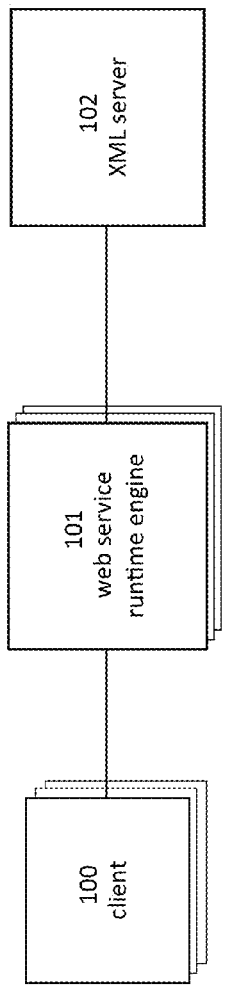
FIG. 3 shows multiple clients accessing an XML server 102 through multiple instances of a web service runtime engine 101, in accordance with certain example embodiments.

As indicated above, moving access enforcement responsibility to a component outside of the XML server 102 advantageously reduces the load thereon and also allows for the above-mentioned installation of multiple web service runtime engines 101 in front of one XML server 102. In this regard, FIG. 3 shows multiple clients accessing an XML server 102 through multiple instances of a web service runtime engine 101, in accordance with certain example embodiments. It will be appreciated that the web service runtime engine 101 shown in FIG. 3 may have the same or similar structure to the corresponding elements shown in FIG. 1 or 2.

As will be appreciated from the above, certain example embodiments relate to the automatic generation of access enforcement rules that then may be used by the web service runtime. Certain example embodiments also relate to the way that the enforcement can be based on the same security definitions that apply to the access of data in the backend system, and how these can be used to determine the access permissions in the web service runtime, e.g., because the data structure was used as the basis for the automatic web service generation, and the access permissions are also defined based on the data structure.

Another aspect of certain example embodiments relates to using the XML structure-based ACLs 107 to dynamically generate WSDL files for each request by client 100, e.g., based on the access permissions of the client 100. The generic WSDL 106, which contains all possible service calls based on the CRUD generation, may be adapted or otherwise programmed by the WSDL engine 103 to include only the service calls that the client 100 is allowed to execute. Based on the WSDL that is retrieved by the client 100, the generic WSDL file 106 provides additional information (e.g., extensions added by the CRUD web service generator 110 during the web service creation) to indicate which XML data 108 can be accessed in which manner by the service call. Using information from the XML schemas 109 and the XML structure-based ACLs 107, the WSDL engine 103 can determine which of the defined operations in the generic WSDL file 106 are permitted for the client 100 and can then return a WSDL containing only the permitted operations.

The CRUD web service generator 110 may be extended to also include information about the used XML document for a certain operation. This information enables the WSDL engine 103 to determine which access restrictions apply for a certain client 100 by using the document structure information from the XML schemas 109 and the ACLs from the XML structure-based ACLs 107. Semantic annotations as defined in the W3C Recommendation concerning Semantic Annotations for WSDL and XML Schema dated 28 Aug. 2007, for example, may be used to annotate the operations defined in the WSDL files to include the XML root elements of the documents affected by these operations, thereby resulting in the generic WSDL files 106 that can be used to compute client-specific WSDL files (discussed in greater detail below).

The web service runtime engine 101 may be extended to call the web service runtime access enforcement module 104, e.g., before executing a deployed web service 105. The call to the web service runtime access enforcement module 104 may pass information about the XML data 108 to be accessed, so that the web service runtime access enforcement module 104 can evaluate the access permissions.

The web service runtime access enforcement module 104 may be implemented as a Java application that uses the Tamino API4J to retrieve the XML documents that reflect the XML structure-based ACLs 107 in the XML server 102 and are based on the information about the XML data 108 to be accessed, which is passed to it from the web service runtime engine 101. The web service runtime access enforcement module 104 returns a permit or deny for the web service operation to be executed and the 101 will need to ensure that this decision is then enforced. Of course, the web service runtime access enforcement module 104 may be implemented in other languages in different example embodiments, and/or different APIs may be used as appropriate for the different combinations and sub-combinations of, for example, XML server and web service stack implementations.

Figure 4:
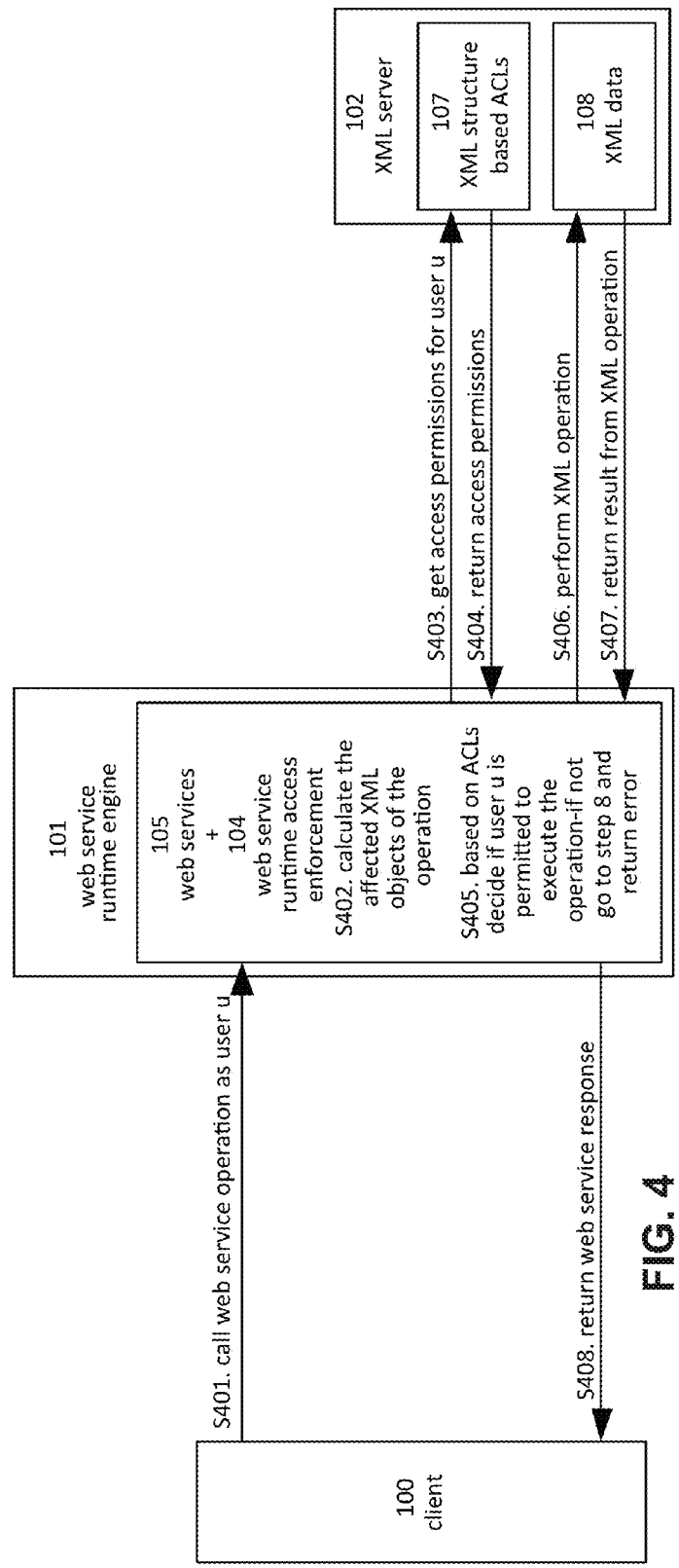
FIG. 4 shows how web service runtime access enforcement may be accomplished in accordance with certain example embodiments.

In this vein, FIG. 4 shows how web service runtime access enforcement may be accomplished in accordance with certain example embodiments. As shown in FIG. 4, in step S401, a web service operation is called from the client 100 on behalf of user u. It is noted that user u may directly invoke the web service, or the web service may be invoked on the user u's behalf (e.g., with or without the user u having knowledge that any one or more particular web services are being called). The call is passed to the web service runtime engine 101 and, more particularly, to the web services block 105 and web service runtime enforcement block 104. In step S402, the web services 105 calculates the affected XML objects of the implicated operation. Access permissions for user u are obtained from the XML structure-based ACLs 107 in the XML server 102, e.g., they are requested in step S403 and returned in step S404. In step S405, at the web service runtime engine 101, a decision is made, based on the returned ACLs, as to whether user u is permitted to execute the operation. If the user is permitted to execute the operation, then the XML operation is performed on the XML data 108 in step S406 (e.g., at the XML server 102 where the XML data 108 resides), and the results of the operation are returned to the web service runtime engine 101 in step S407. In step S408, the web service response is returned, e.g., after the operation has been completed. However, steps S406 and S407 are not performed in the event that it is determined that user u cannot execute the operation. In this case, an error may be thrown and/or a suitable message may be generated and returned to the client 100.

Figure 5:
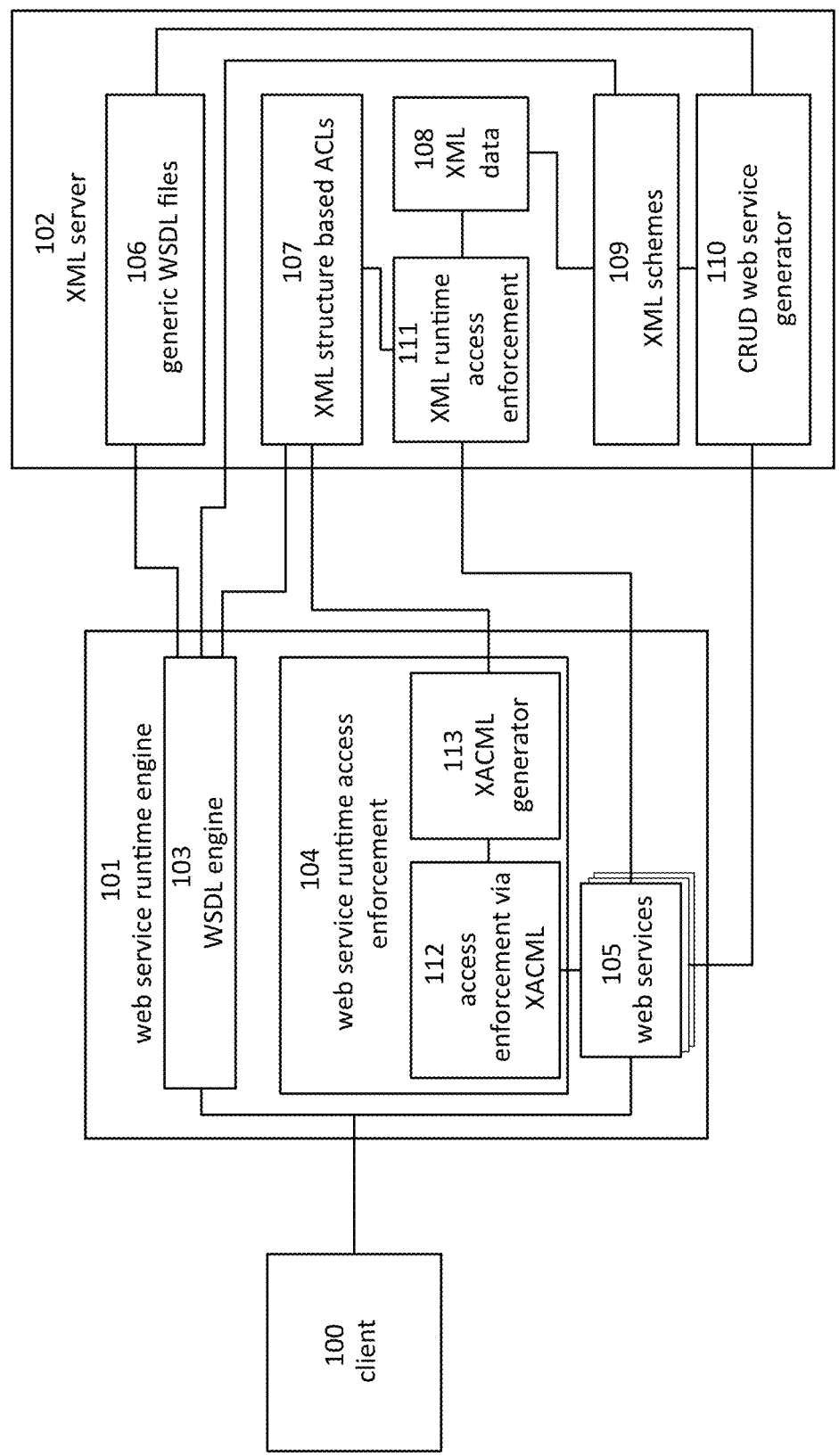
FIG. 5 is a block diagram illustrating runtime access enforcement via XACML in accordance with certain example embodiments.

FIG. 5 is a block diagram illustrating runtime access enforcement via XACML in accordance with certain example embodiments. The FIG. 5 block diagram is similar to the FIG. 1 block diagram. However, if the web service runtime engine 101 has built-in support for (or can be extended to support) access enforcement based on XACML, it may be desirable to include an XACML enforcement component 112 in the web service runtime engine 101. In a similar vein, an XACML generator 113 may be implemented in order to help generate XACML policies based on the XML structure based ACLs 107. The XACML enforcement component 112 and the XACML generator 113 both may be located directly within the web service runtime access enforcement component 104 of the web service runtime engine 101 in certain example embodiments. This may help further decouple the client from the authorization decision.

XACML allows for specifying simple access control policies based on action, target, and subject, which can be used, for example, to model the access control on the CRUD web services 105 based on the document types in the backend XML server 102. Action ids may be set to the actions "create", "read", "update", and "delete". Target resource ids may be the web services for a certain document type. Subject ids may reflect the users that are accessing the system. An example of such an XACML policy that grants "read" to the user with common name "user1" and denies "read" access to all other users may be implemented as follows:

```
<Policy PolicyId="readAccessJobapplication"
  RuleCombiningAlgId="urn:oasis:names:tc:xacml:1.0:rule-combining-
  algorithm:permit-overrides">
  <Target>
    <Resources>
      <Resource>
        <ResourceMatch
          MatchId="urn:oasis:names:tc:xacml:1.0:function:string-equal">
          <AttributeValue DataType=
            "http://www.w3.org/2001/XMLSchema#string">jobapplication
          </AttributeValue>
          <ResourceAttributeDesignator
            DataType="http://www.w3.org/2001/XMLSchema#string"
            AttributeId="urn:oasis:names:tc:xacml:1.0:resource:resource-
            id" />
        </ResourceMatch>
      </Resource>
    </Resources>
  </Target>
  <Rule RuleId="readAccessJobapplication01" Effect="Permit">
    <Target>
      <Subjects>
        <Subject>
          <SubjectMatch MatchId=
            "urn:oasis:names:tc:xacml:1.0:function:x500Name-equal">
            <AttributeValue
              DataType="urn:oasis:names:tc:xacml:1.0:data-
            type:x500Name">CN=user1
            </AttributeValue>
            <SubjectAttributeDesignator AttributeId=
              "urn:oasis:names:tc:xacml:1.0:subject:subject-id"
              DataType="urn:oasis:names:tc:xacml:1.0:data-
              type:x500Name" />
          </SubjectMatch>
        </Subject>
      </Subjects>
      <Actions>
        <Action>
          <ActionMatch MatchId=
            "urn:oasis:names:tc:xacml:1.0:function:string-equal">
            <AttributeValue DataType=
              "http://www.w3.org/2001/XMLSchema#string">read
            </AttributeValue>
            <ActionAttributeDesignator AttributeId=
              "urn:oasis:names:tc:xacml:1.0:action:action-id"
              DataType="http://www.w3.org/2001/XMLSchema#string" />
          </ActionMatch>
        </Action>
      </Actions>
    </Target>
  </Rule>
  <Rule RuleId="readAccessJobapplication02" Effect="Deny" />
</Policy>
```

It will be appreciated that more complicated rules also can be developed, e.g., if simpler rules are built up or otherwise compounded over time.

Similar to the description above, the WSDL engine 103 may be implemented as a Java application that uses the Tamino API4J to retrieve the corresponding data from the generic WSDL files 106, the XML structure based ACLs 107, and XML schemas 109 from the XML server 102. Because the generic WSDL file 106 includes the XML document root that is affected by the operations described in the WSDL, the WSDL engine 103 can calculate the access permissions for a given client 100 based on the additional information in the XML structure based ACLs 107 and the XML schemas 109 and can therefore, for each operation (create, read, update, delete) decide, whether the corresponding client 100 is permitted to perform the operation. In certain example embodiments, the resulting WSDL will only contain the operations that the corresponding client 100 is permitted to execute. Similar to as above, the WSDL engine 103 may be implemented in other languages in different example embodiments, and/or different APIs may be used as appropriate for the different combinations and sub-combinations of, for example, XML server and web service stack implementations.

Figure 6:
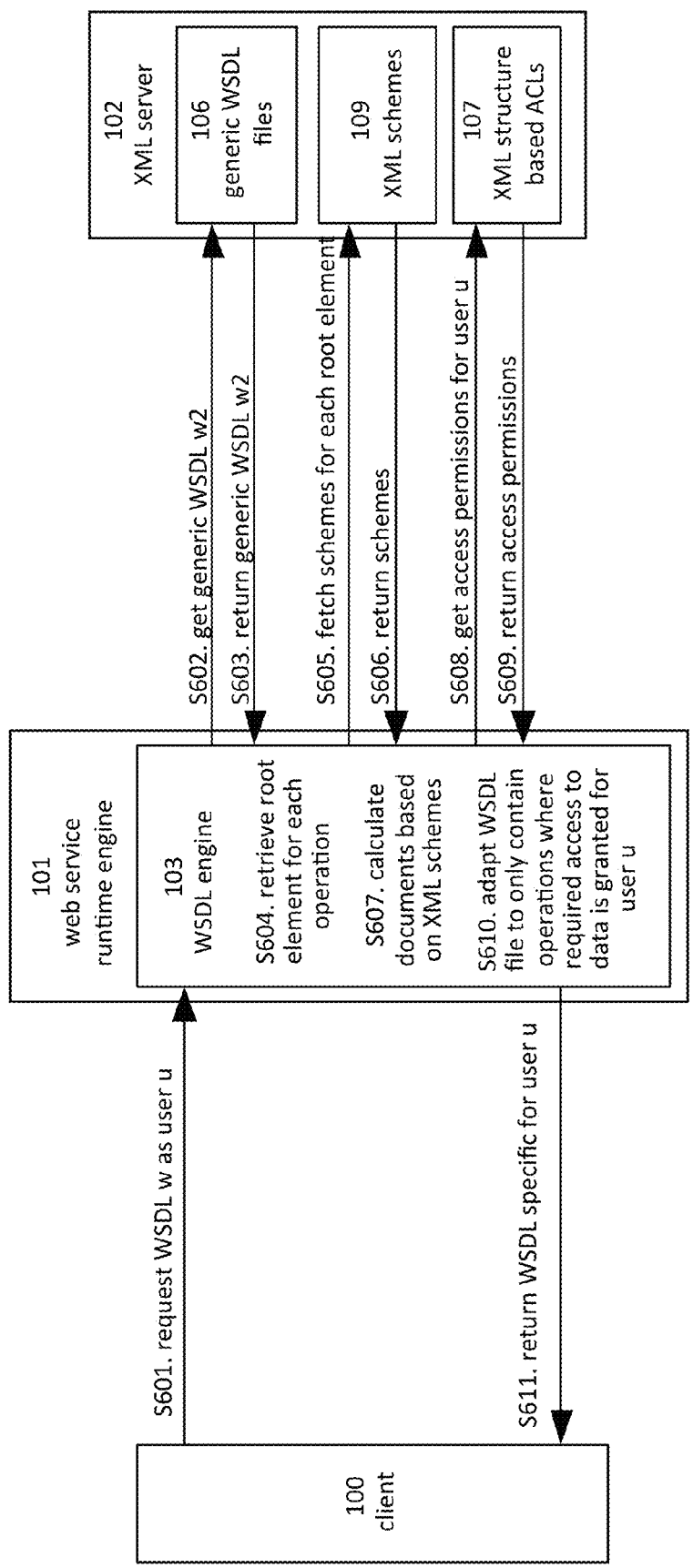
FIG. 6 shows how a specific WSDL may be generated in accordance with certain example embodiments.

FIG. 6 shows how a specific WSDL may be generated in accordance with certain example embodiments. As shown in FIG. 6, the client 100 requests a WSDL w on behalf of user u in step S601. The WSDL engine 103 of the web service runtime engine 101 receives this request, and obtains the generic WSDL w2 from the generic WSDL files 106 in the XML server, e.g., via get and return steps S602 and S603. The WSDL engine 103 in step S604 is then able to retrieve the root element for each operation, which then may be used to fetch the schemas for each root element from the XML schemas 109 in step S605, and return the same in step S606. The relevant documents are calculated based on the XML schemas in step S607. Then, permissions for user u for those documents are retrieved from the XML structure based ACLs 107 via get and return operations in steps S608 and S609. Once the ACLs are returned to the WSDL engine 103, in step S610, the WSDL file is adapted to only contain operations where the required access to the data is actually granted for the user u. The thus-generated WSDL specific for user u is returned to the client 100 in step S611.

EXAMPLE

A perhaps more concrete example of certain of the illustrative techniques set forth herein will now be provided in connection with a hypothetical job application database. Assume, for the purpose of this example, that an XML database includes documents representing job applications. A client should be able to create job applications directly in the database, and each such job application includes two parts. The open part is the portion that a client creates and is always visible to the client. The closed part is only visible and modifiable to the agent handling the application. The closed part is optional, since each application is first created without this. The closed part is not visible for the client. In addition to that, there are also reviewers that may read all information in the job applications, but may not make any modifications.

In this example, job applications conform to the following schema:

```
<xs:schema xmlns:xs="http://www.w3.org/2001/XMLSchema">
<xs:element name="jobapplication">
  <xs:complexType>
    <xs:sequence>
      <xs:element ref="openpart" />
      <xs:element ref="closedpart" minOccurs="0" maxOccurs="1" />
    </xs:sequence>
  </xs:complexType>
</xs:element>
<xs:element name="openpart">
  <xs:complexType>
    <xs:sequence>
      <xs:element name="applicant" type="xs:string"/>
      <xs:element name="request" type="xs:string"/>
    </xs:sequence>
```

```
  </xs:complexType>
</xs:element>
<xs:element name="closedpart">
  <xs:complexType>
    <xs:sequence>
      <xs:element name="agent" type="xs:string" />
      <xs:element name="remark" type="xs:string" />
    </xs:sequence>
    <xs:attribute name="id" type="xs:integer" />
  </xs:complexType>
</xs:element>
</xs:schema>
```

Figure 7:
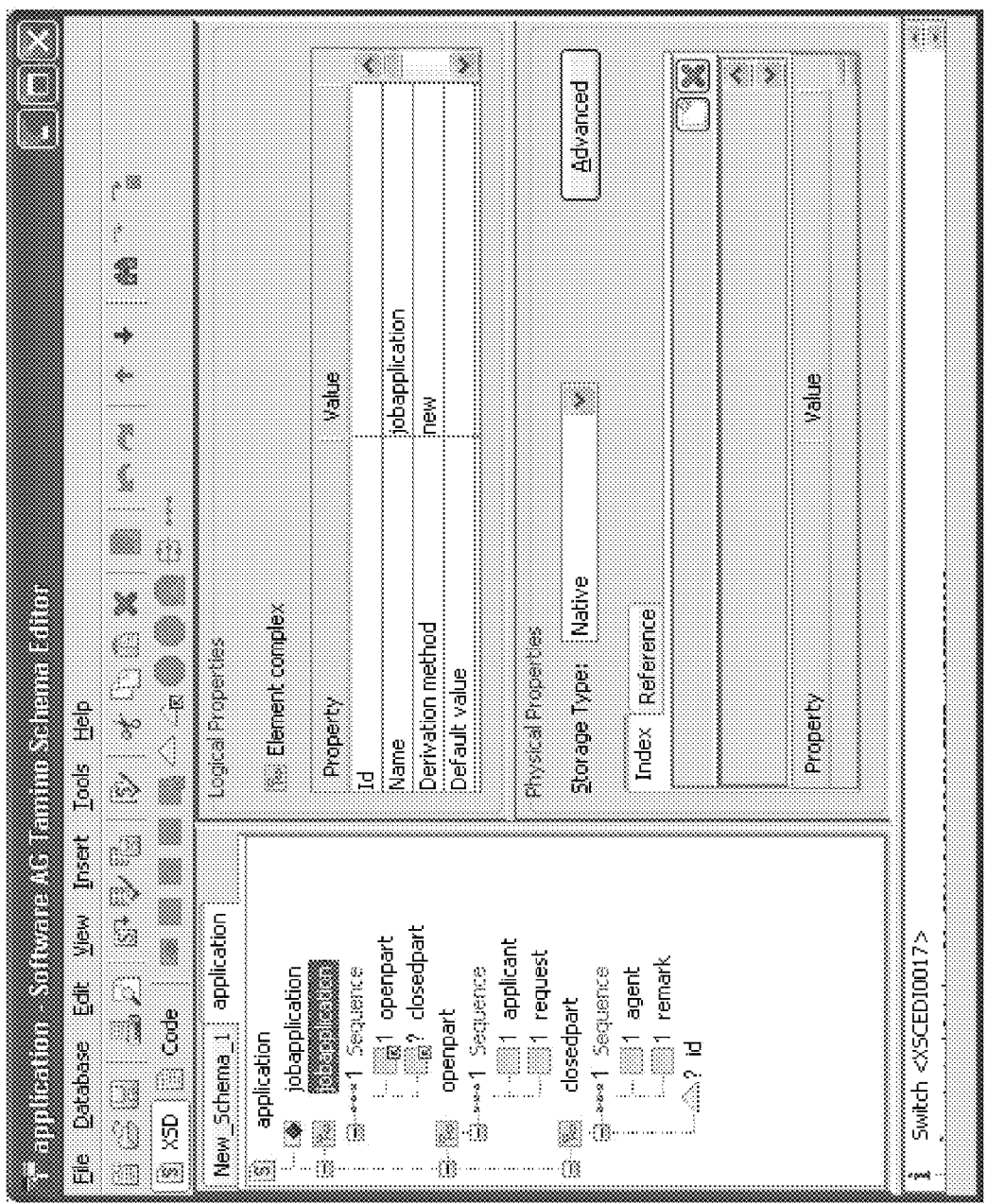
FIG. 7 is an illustrative screenshot showing the job application database schema in a tree view as provided by Tamino XML Schema Editor, in accordance with certain example embodiments.

FIG. 7 is an illustrative screenshot showing the job application database schema in a tree view as provided by Tamino XML Schema Editor, in accordance with certain example embodiments. Documents of type "jobapplication" are contained in the Tamino collection "applcol". Access permissions are defined as follows:

1. Grant full access to user "admin" for the complete "jobapplication" document.
2. Grant access to user "applicant" to "jobapplication" documents, but restrict access to the element "closedpart" so that users cannot see or change this.
3. Grant read access to the complete "jobapplication" document to the user "reviewer".

The resulting Tamino ACL definitions may appear as follows, keeping in mind that users are not directly assigned to ACLs but rather via groups:

```
<acl aclname="adminAcl">
  <ace access="change">applcol/jobapplication</ace>
</acl>
<group groupname="adminGroup">
  <aclref>adminAcl</aclref>
  <userref>admin</userref>
</group>
<acl aclname="applicantAcl">
  <ace access="change">applcol/jobapplication</ace>
  <ace access="no">applcol/jobapplication/closedpart</ace>
</acl>
<group groupname="applicantGroup">
  <aclref>applicantAcl</aclref>
  <userref>applicant</userref>
</group>
<acl aclname="reviewerAcl">
  <ace access="read">applcol/jobapplication</ace>
</acl>
<group groupname="reviewerGroup">
  <aclref>reviewerAcl</aclref>
  <userref>reviewer</userref>
</group>
```

Because the document part starting with the element "closedpart" is optional, the user "applicant" can create a new document such as:

```
<jobapplication id="123">
  <openpart>
    <applicant>Joe Stormer</application>
    <request>I really would like to have this job!</request>
  </openpart>
</jobapplication>
```

Figure 8:
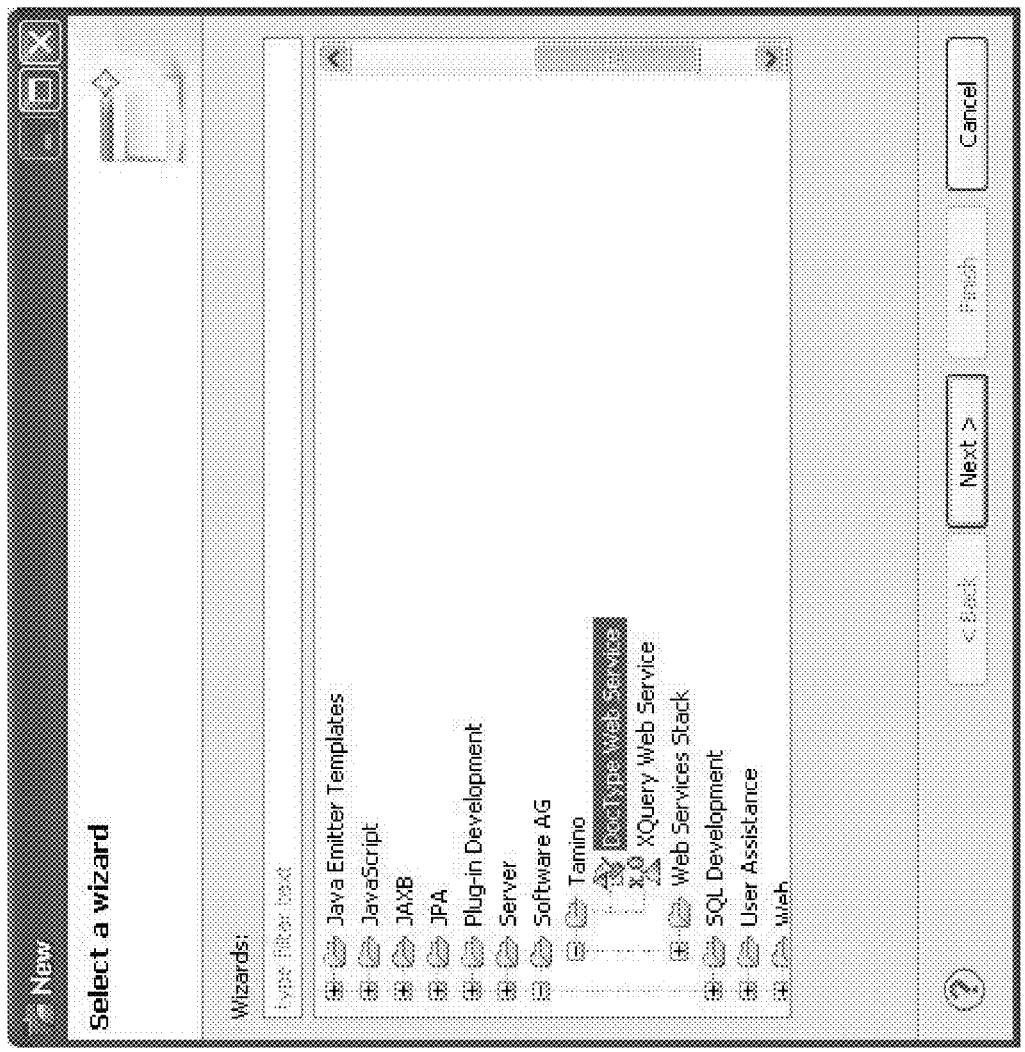
Figure 9:
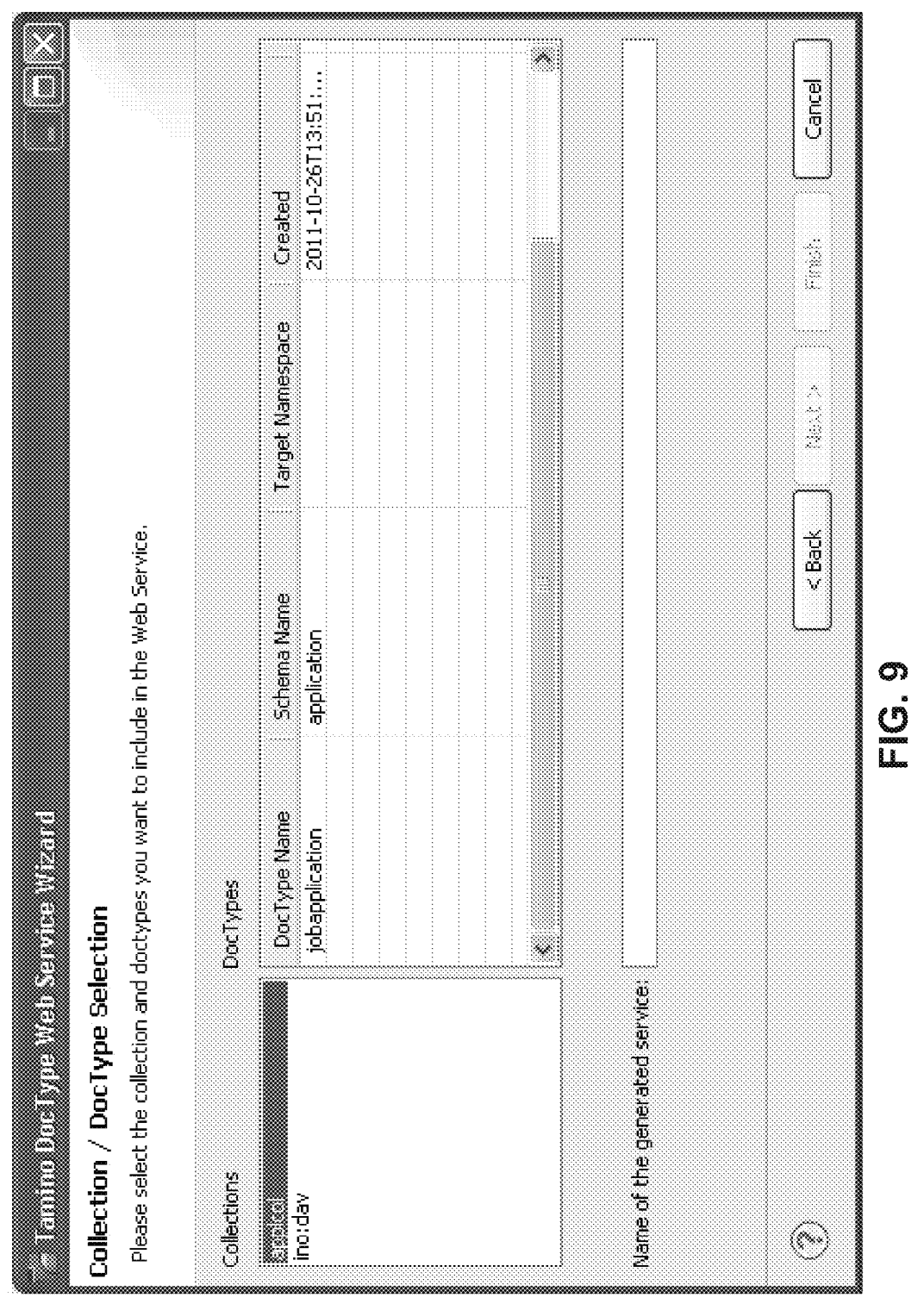

Certain example embodiments allow for the automatic generation of a CRUD web service from an XML schema definition offering basic operations upon the documents conforming to this schema. Accordingly in this specific example, the thus-created service may create, read, update, and delete "jobapplication" documents. FIGS. 8-9 are example screenshots showing how a wizard can be used to generate a CRUD web service, in accordance with certain example embodiments. In certain example implementations, the service may be created in the form of an aar-file that can be deployed using a typical Java application server such as Tomcat.

The following excerpts show the WSDL's representation of the fact that any service user can read a complete application. More particularly, the first excerpt shows the operation's definition.

```
<wsdl:operation name="read">
    <wsdl:input message="tns:readRequestM"/>
    <wsdl:output message="tns:readResponseM"/>
</wsdl:operation>
```

The operation "read" returns instances of "tns:readResponseM", which is defined as follows:

```
<wsdl:message name="readResponseM">
    <wsdl:part name="parameters" element="tns:readResponse"/>
</wsdl:message>
```

The type "readResponse" is defined as the complete doctype:

<xs:element name="readResponse" type="tns:DTDocumentType"

Thus, the WSDL thinks the answer to a read call is the complete jobapplication, regardless of the user that sent the request. If the request is issued by user "client," the service can only read the open parts from the database and thus only returns these.

The above-mentioned WSDL parts are put in the generic WSDL 106 and are the basis for the generating the WSDL specific for a call. Thus, when the user "reviewer" tries to retrieve the WSDL from the web service runtime engine, the following "update" operation would not be returned, whereas if the user "admin" requests the same WSDL, this section will be included:

```
<wsdl:operation name="update">
    <wsdl:input message="tns:updateRequestM"/>
    <wsdl:output message="tns:updateResponseM"/>
</wsdl:operation>
```

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate transitory or non-transitory/tangible computer readable storage medium. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer system, comprising:
    a web service runtime engine that uses first processing resources, the web service runtime engine including:
        a plurality of web services configured to perform operations in connection with XML data, and
        a web service runtime access enforcement module; and
    an XML server that uses second processing resources that are different from the first processing resources, the XML server including:
        a non-transitory XML data storage area tangibly storing the XML data,
        a non-transitory XML schema storage area tangibly storing a plurality of XML schemas that describe the XML data, and
        a non-transitory access control list (ACL) storage area tangibly storing XML structure-based ACLs, defining whether and (if possible) how clients and/or web services can access the XML data;
    wherein the web service runtime access enforcement module is configured to determine, at the web service runtime engine, whether a given web service initiated by or on behalf of a user using a client computer can perform one or more requested operations on the XML data, based on a corresponding XML structure-based ACL stored in the non-transitory ACL storage area.

2. The system of claim 1, wherein the web service runtime access enforcement module is configured to selectively either (a) prevent the one or more requested operations of the given web service and cause an error to be returned to the client, or (b) allow the one or more requested operations of the given web service and cause their results, if any, to be returned to the client, in dependence on the determination.

3. The system of claim 1, wherein the ACLs define whether and (if possible) how clients and/or web services can access the XML data using Create, Read, Update, and Delete (CRUD) specifications.

4. The system of claim 1, wherein the XML server further comprises a CRUD web service generator configured to generate web services to be deployed to the web service runtime engine, and WSDL files describing the generated web services.

5. The system of claim 1, wherein the XML schemas are used to generate the web services in the web service runtime engine, the XML schemas also defining access permissions for the XML data in the XML server at a structural level.

6. The system of claim 1, wherein XML runtime access enforcement is off-loaded from the XML server such that the XML server itself does not engage in XML runtime access enforcement.

7. The system of claim 1, further comprising an XACML (extensible access control markup language) enforcement component and an XACML generator, located within the web service runtime access enforcement component of the web service runtime engine, and cooperating to enable access control policies to be set using action, target, and subject attributes.

8. The system of claim 1, further comprising multiple instances of the web service runtime engine.

9. An access control method for use in a computer system including a plurality of client computers operated by respective users, an XML server that uses first processing resources, and a web service runtime engine interposed between the client computers and the XML server, the web service runtime engine using second processing resources that are different from the first processing resources, the method comprising:

- receiving, from a client computer and at the web service runtime engine, a call for a web service operation;
- identifying which XML data objects from a database of XML data objects located on the XML server are implicated by the web service operation that has been called, the XML data objects having corresponding XML data structures;
- retrieving, from an access permission store on the XML server, access permissions for the user for the identified XML data objects, the access permissions in the access permission store being generated automatically from XML data structures for corresponding XML data objects;
- determining, at the web service runtime engine and based on the retrieved access permissions, whether the called web service operation can be performed on behalf of the user; and
- either permitting or prohibiting the called web service operation based on the determination.

10. The method of claim 9, further comprising returning a web service response to the client following the permitting or prohibiting.

11. The method of claim 10, wherein the web service response includes a fault message when the called web service operation is prohibited.

12. The method of claim 9, wherein the access permissions in the access permission store are CRUD-type permissions.

13. The method of claim 9, wherein calls to the web service runtime engine are made via SOAP requests.

14. The method of claim 9, wherein a trust relationship is formed between the web service runtime engine and the XML server such that access enforcement responsibilities are offloaded from the XML server and onto the web service runtime engine.

15. The method of claim 9, further comprising generating, at the web service runtime engine, extensible access control markup language (XACML)-type policies based on the permissions, the XACML policies being consulted in determining whether the called web service operation can be performed on behalf of the user.

16. A non-transitory computer readable storage medium tangibly storing instructions that, when executed by at least one processor of a computer, perform a method according to claim 9.

17. A web service access control method for use in a computer system including a plurality of client computers operated by respective users, an XML server storing XML documents in a storage location thereon, and a web service runtime engine interposed between the client computers and the XML server, the method comprising:

- receiving, at the web service runtime engine, a request for a user-specific WSDL from a given client computer;
- retrieving, from a store of generic WSDL files storing all possible web service calls for all client computers and all users, a listing of all web service calls possible for the given client computer, the store of generic WSDL files being located on the XML server;
- identifying a root element for each web service call possible for the given client computer;
- obtaining, from the XML server, XML schemas associated with the identified root element(s);
- determining XML documents associated with the obtained XML schemas;
- deriving, from an access permission store on the XML server, access permissions for the user for the identified XML documents, the access permissions in the access permission store being generated in dependence on structures associated with the XML documents;
- generating the user-specific WSDL from the derived access permissions such that the user-specific WSDL includes operations where the required access to the XML documents is granted for the respective user; and
- returning the user-specific WSDL to the client.

18. The method of claim 17, wherein each said client is configured to control access to web services in dependence on a user-specific WSDL with its respective user.

19. The method of claim 17, wherein the generic WSDL files include extensions added by a web service generator during web service creation, the extensions being indicative of which XML data can be accessed in which manner by an associated web service call.

20. The method of claim 19, wherein the extensions are CRUD extensions.

* * * * *